(12) United States Patent
McBride et al.

(10) Patent No.: US 7,870,095 B2
(45) Date of Patent: Jan. 11, 2011

(54) APPARATUS, SYSTEM, AND METHOD FOR REPLICATION OF DATA MANAGEMENT INFORMATION

(75) Inventors: Gregory E. McBride, Vail, AZ (US); Todd B. Schlomer, Westminster, CO (US); John J. Wolfgang, Midlothian, VA (US)

(73) Assignee: International Business Machines Corporation, Armonk, NY (US)

(*) Notice: Subject to any disclaimer, the term of this patent is extended or adjusted under 35 U.S.C. 154(b) by 438 days.

(21) Appl. No.: 11/949,597

(22) Filed: Dec. 3, 2007

(65) Prior Publication Data
US 2009/0144344 A1   Jun. 4, 2009

(51) Int. Cl.
*G06F 7/00* (2006.01)
*G06F 17/00* (2006.01)

(52) U.S. Cl. .................... 707/615; 707/626

(58) Field of Classification Search ............ 707/1–10, 707/615, 626; 709/205, 223
See application file for complete search history.

(56) References Cited

U.S. PATENT DOCUMENTS

| | | | |
|---|---|---|---|
| 6,701,345 B1 * | 3/2004 | Carley et al. | 709/205 |
| 6,947,982 B1 | 9/2005 | McGann et al. | 709/224 |
| 7,403,901 B1 * | 7/2008 | Carley et al. | 705/2 |
| 2003/0014526 A1 | 1/2003 | Pullara et al. | 709/227 |
| 2003/0120669 A1 | 6/2003 | Han et al. | 707/100 |
| 2003/0217040 A1 | 11/2003 | Osborne et al. | 707/1 |
| 2005/0033777 A1 | 2/2005 | Moraes et al. | 707/202 |
| 2006/0059253 A1 * | 3/2006 | Goodman et al. | 709/223 |
| 2006/0195340 A1 | 8/2006 | Smitherman et al. | 705/2 |
| 2006/0248125 A1 | 11/2006 | Kawamura | 707/201 |
| 2006/0294241 A1 | 12/2006 | Cherian et al. | 709/227 |

* cited by examiner

*Primary Examiner*—Hosain T Alam
*Assistant Examiner*—Navneet K Ahluwalia
(74) *Attorney, Agent, or Firm*—Kunzler Needham Massey & Thorpe

(57) ABSTRACT

An apparatus, system, and method are disclosed for replication of data management information. A base replication module replicates a base table on an active server to a first and second standby server. The base table comprises configuration parameters for storage devices, logical volumes, physical interconnections, logical interconnections, and logical subsystems of a storage system, and the like. A session replication module replicates first sessions from a session table stored on the active server to the first standby server and second sessions to the second standby server. The session table stores a plurality of sessions. Each session comprises a plurality of copy sets. The active server manages the sessions using the base table and the session table, and the first and second standby servers do not manage the sessions. A transfer module transfers management of the first sessions to the first standby server.

17 Claims, 6 Drawing Sheets

APPARATUS, SYSTEM, AND METHOD FOR REPLICATION OF DATA MANAGEMENT INFORMATION

BACKGROUND OF THE INVENTION

1. Field of the Invention

This invention relates to data replication and more particularly relates to replication of data management information.

2. Description of the Related Art

Data storage systems often store data that is vital to the operation of an organization. For example, a data storage system may store customer transaction information, account information, and the like. As a result, it is important that the stored data be reliably available.

A high availability data storage replication management system may organize data in copy sets. Each copy set may comprise one or more volumes, typically contained on a data storage system, in a copy services relationship. For example, a first and second logical volume may be in a copy services relationship with a third and fourth logical volume. The first logical volume may be copied to the third logical volume and the second logical volume may be copied to the fourth logical volume so that the third logical volume mirrors the first logical volume and the fourth logical volume mirrors the second logical volume.

One or more copy sets may be organized as a session. An active server may manage a plurality of sessions using a base table storing configuration parameters and a session table storing one or more sessions. The copy set information may by organized in a plurality of base tables and a plurality of session tables. In addition, a standby server may mirror the base table and the session table, and take over session management functions from the active server if the active server fails.

SUMMARY OF THE INVENTION

From the foregoing discussion, there is a need for an apparatus, system, and method that replicates the configuration and status information needed for a data replication management system to manage data replication. Beneficially, such an apparatus, system, and method would replicate the data needed by the data replication management system to multiple backup sites and hence may provide multiple high availability standby servers to an active server.

The present invention has been developed in response to the present state of the art, and in particular, in response to the problems and needs in the art that have not yet been fully solved by currently available data storage replication management systems. Accordingly, the present invention has been developed to provide an apparatus, system, and method for data replication management that overcome many or all of the above-discussed shortcomings in the art.

The apparatus for replicating data management information is provided with a plurality of modules configured to functionally execute the steps of replicating the base table, replicating first sessions, transferring management of the first sessions, and terminating management of the first sessions. These modules in the described embodiments include a base replication module, a session replication module, and a transfer module.

The base replication module replicates a base table on an active server to a first and second standby server. The base table comprises configuration parameters for storage devices, logical volumes, physical interconnections, logical interconnections, and logical subsystems of a storage system, and the like.

The session replication module replicates first sessions from a session table stored on the active server to the first standby server and second sessions to the second standby server. The session table stores a plurality of sessions. Each session comprises a plurality of copy sets. The active server manages the sessions using the base table and the session table, and the first and second standby servers do not manage the sessions.

The transfer module transfers management of the first sessions to the first standby server. Additionally, the transfer module terminates management of the first sessions by the active server.

A system of the present invention is also presented for replicating data management information. The system may be embodied in a data storage replication management system. In particular, the system, in one embodiment, includes an active server, a first standby server, a second standby server, a base replication module, a session replication module, and a transfer module.

The base replication module replicates a base table on the active server to the first and second standby server. The base table comprises configuration parameters for storage devices, logical volumes, physical interconnections, logical interconnections, and logical subsystems of a storage system, and the like.

The session replication module replicates first sessions from a session table stored on the active server to the first standby server and second sessions to the second standby server. The session table stores a plurality of sessions. Each session comprises a plurality of copy sets. The active server manages the sessions using the base table and the session table, and the first and second standby servers do not manage the sessions.

The transfer module transfers management of the first sessions to the first standby server. Additionally, the transfer module terminates management of the first sessions by the active server.

A method of the present invention is also presented for replication of data management information. The method in the disclosed embodiments substantially includes the steps to carry out the functions presented above with respect to the operation of the described apparatus and system. In one embodiment, the method includes replicating the base table, replicating first sessions, transferring management of the first sessions, and terminating management of the first sessions.

A base replication module replicates a base table on an active server to a first and second standby server. The base table comprises configuration parameters for storage devices, logical volumes, physical interconnections, logical interconnections, and logical subsystems of a storage system, and the like.

A session replication module replicates first sessions from a session table stored on the active server to the first standby server and second sessions to the second standby server. The session table stores a plurality of sessions. Each session comprises a plurality of copy sets. The active server manages the sessions using the base table and the session table, and the first and second standby servers do not manage the sessions.

A transfer module transfers management of the first sessions to the first standby server. Additionally, the transfer module may terminate management of the first sessions by the active server.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, a system, and a method for replication of data management information. Beneficially, such an apparatus, a system, and a method would divide management information among a plurality of standby servers. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
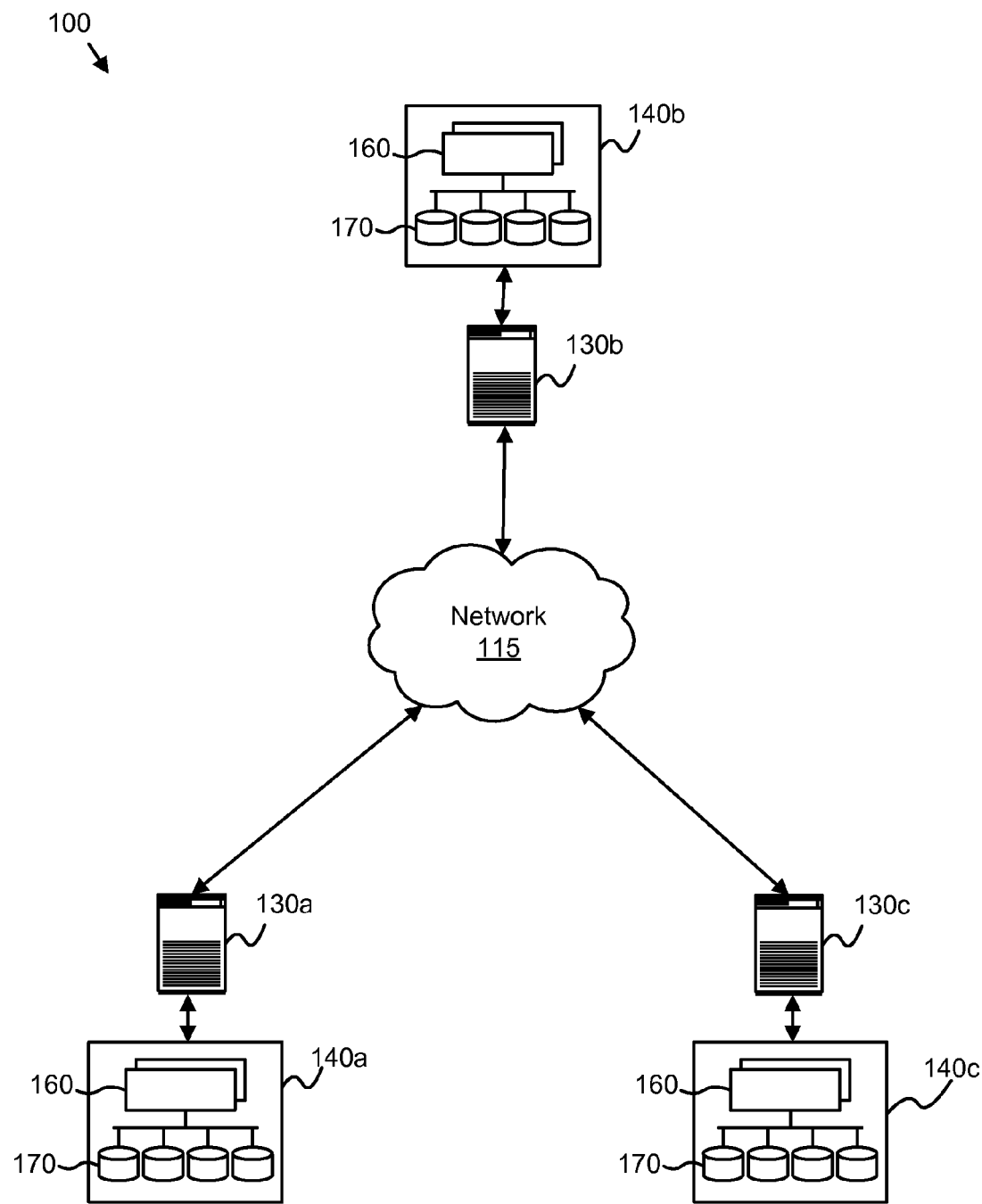
FIG. 1 is a schematic block diagram illustrating one embodiment of a data storage system in accordance with the present invention.

FIG. 1 is a schematic block diagram illustrating one embodiment of a data storage system (DSS) 100 in accordance with the present invention. The DSS 100 includes a network 115, one or more servers 130, and one or more storage subsystems 140. Although, for simplicity only one (1) network 115, three (3) servers 130, and three (3) storage subsystems 140 are shown, any number of those may be used in the DSS 100.

The one or more servers 130 may be configured as mainframe computers, blade centers comprising multiple blade servers, and the like. Any server 130 of the plurality of the servers 130 may act as an active server and the others as standby servers. In the past, there could be only one active server in the DSS 100. The active server of the DSS 100 may execute plurality data storage and replication commands. Each server 130 may have its own memory to store the data in one form or another. The DSS 100 may communicate with one or more client computers (not shown) over the network 115. The one or more client computers are referred to as clients.

Each storage subsystem 140 of the DSS 100 may include one or more storage controllers 160 and one or more storage devices 170. The storage devices 170 may be hard disk drives, optical storage devices, magnetic tape drives, micromechanical storage devices, holographic storage devices, and semiconductor storage devices. Alternatively, the storage device 170 may be configured as a just a bunch of disks (JBOD), a redundant array of independent disks (RAID), a tape library, a storage subsystem, a tape backup, a tape library, a compact disk read only memory (CD ROM) library, and the like. One of skill in the art will readily recognize that the DSS 100 could also include other data processing devices such as bridges, scanners, printers, and the like.

The one or more storage controllers 160 of the storage subsystem 140 may control the input/output (I/O) operations of data storage and replication. The storage controllers 160 may network the storage devices 170 by one or the other method known to those skilled in the art.

The storage device 170 may store the data for the plurality of the clients. Each storage device 170 may communicate via a unidirectional or a bidirectional path with the plurality of servers 130. The communication between the servers 130 and the storage device 170 may be through cables or wired lines and/or wireless by methods known to those skilled in the art.

The storage devices 170 may store the data in one or more files. For example, the storage device 170 may store the data in one or more files using a disk file systems such as file allocation table (FAT), new technology file system (NTFS), hierarchical file system (HFS), hierarchical file system plus (HFS+), second extended file system (ext2), third extended file system (ext3) and/or the like to store the files of certain size created by one or more clients 110 in appropriate directories.

The network 115 may comprise one or more nodes those may connect the servers 130 for the data storage and replication. The network 115 may be selected from a local area network (LAN), a wide area network (WAN), an Internet, an Ethernet network, a token ring network, or the like. The communication over the network 115 may be through cables, wired lines, and the like and/or wireless.

In one embodiment, the DSS 100 provides data storage and data replication services for the plurality of clients. The storage controller 160 may store, retrieve, and replicate the data from the storage device 170 as directed by a server 130. In one embodiment, an active server 130a may direct the storage controller 160 to replicate data. A copy set may specify a source volume and target volume pair, each comprising a storage device 170. The active server 130a may direct the storage controller to replicate data from the source volume to the target volume using the information stored in the copy set.

Figure 2:
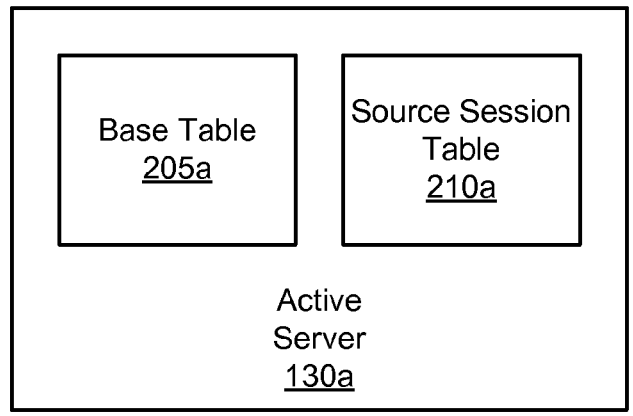
FIG. 2 is a schematic block diagram illustrating one embodiment of a server system of the present invention.
Figure 2:
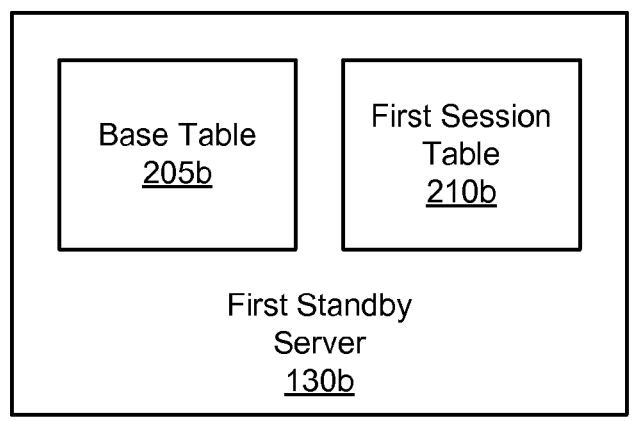
Figure 2:
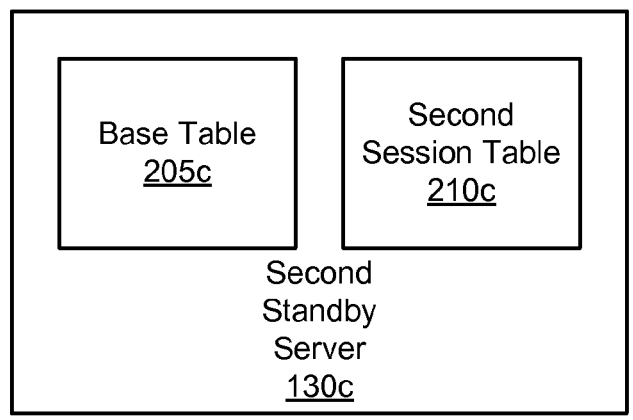

FIG. 2 is a schematic block diagram illustrating one embodiment of a server system 200 of the present invention. The description of the server system 200 refers to elements of FIG. 1, like numbers referring to like elements. The server system 200 includes an active server 130a, a first standby server 130b, and a second standby server 130c. Although, for simplicity only one (1) active server 130a, one (1) first standby server 130b, and one (1) second standby server 130c are shown, the server system 200 may include one (1) active server 130a and any number of standby servers 130b-c.

The active server 130a, the first standby server 130b, and the second standby server 130c may be the servers 130 of the FIG. 1. In the shown embodiment, the active server 130a includes a first base table 205a and a source session table 210a. The first standby server 130b includes a second base table 205b and a first session table 210b, and the second standby server 130c includes a third base table 205c and a second session table 210c. The first and second session tables 210b-c may also be referred to as standby server session tables 210b-c.

Although for simplicity the first base table 205a is shown as a single table, the first base table 205a may comprise a plurality of tables and related data structures. A data manager may create the first base table 205a. The first base table 205a may be a system table.

The first base table 205a stores configuration parameters for storage devices 170, logical volumes, physical interconnections, logical interconnections, logical subsystems of a storage system, and the like. The configuration parameters for the storage devices 170 may include information of a number of storage devices 170 in each storage subsystem 140, a number of independent disks in a RAID or the like, a storage capacity of each disk of the plurality of storage devices 170, a number and storage capacities of logical volumes on the particular disk of the storage device 170, and/or the like. The logical volume may include one or more physical portions of storage devices 170.

The configuration parameters for the physical interconnections may include information of the physical interconnections between the storage subsystems 140 of the DSS 100. The physical interconnections may be through an Ethernet channel, an InfiniBand, a Wi-Fi, or the like.

The configuration parameters for the logical interconnections may further include information of the logical interconnections in the form of copy services relationship between the plurality of storage subsystems 140 of the DSS 100. The logical interconnections may be through logical identifiers identifying source and destination addresses of the plurality of storage subsystems 140 that are in the copy services relationship.

The first base table 205a may also include a set of catalogue tables. For example, a database manager may create and maintain the set of catalogue tables configured as the first base table 205a.

Although for simplicity, the source session table 210a is shown as a single table, the source session table 210a may comprise a plurality of tables and related data structures. The data manager may create the source session table 210a. The source session table 210a may include a plurality of rows. Each row of the source session table 210a may include a plurality of columns. Each row of the source session table 210a may correspond to a session. Each session of the source session table 210a may include one or more copy sets. Each copy set may comprise one or more volumes in a copy services relationship.

The second base table 205b on the first standby server 130b and the third base table 205c on the second standby server 130c may substantially be same as the first base table 205a on the active server 130a. In one embodiment, the second and third base tables 205b-c include the plurality of tables and related data structures of the first base table 205a. The rows of the first base table 205a may be replicated using the SQL commands that mirror the first base table 205a to the second and third base tables 205b-c.

In the shown embodiment, the first standby server 130b and the second standby server 130c include the first session table 210b and the second session table 210c respectively. In one embodiment, the first and second session tables 210b-c include the plurality of tables and related data structures of the source session table 210a. However, the data stored in first and second session tables 210b-c is not equivalent to the data stored on the source session table 210a. Rows of the first session table 210b may substantially replicate some rows of the source session table 210a on the active server 130a while rows of the second session table 210c may substantially replicate other rows of the source session table 210a. In one embodiment, some rows are not replicated.

The active server 130a may mirror some of the writes of the source session table 210a to create the first session table 210b on the first standby server 130b and may mirror other writes to create the second session table 210c as well on the second standby server 130c. The source session table 210a, the first session table 210b, and the second session table 210c may be updated as well. For example, the first session table 210b on the first standby server 130b may be the global mirror image and the second session table 210c on the second standby server 130c may be the metro mirror image of the source session table 210a.

Figure 3:
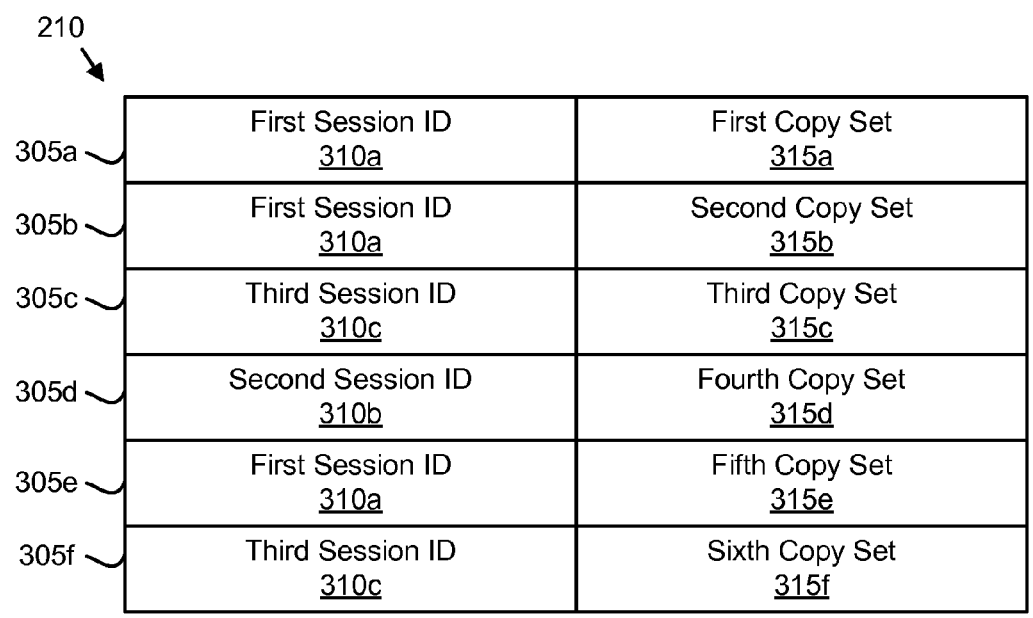
FIG. 3 is a schematic block diagram illustrating one embodiment of a session table of the present invention.

FIG. 3 is a schematic block diagram illustrating one embodiment of a session table 210 of the present invention. The description of the session table 210 refers to elements of FIGS. 1-2, like numbers referring to like elements. The session table 210 includes a plurality of rows 305a-f. Although, for simplicity only six (6) rows 305a-f are shown, the session table 210 may include any number of rows 305. The shown session table 210 may be the source session table 210a on the active server 130a, the first session table 210b on the first standby server 130b, or the second session table 210b on the second standby server 130c.

The session table 210 may be stored in the memory of a server 130. Each row 305 of the session table 210 may include a session identifier (ID) 310 in a first column and a copy set 315 in a second column. Each row 305 of the session table 210 may represent a session.

In the shown embodiment, each row 305 includes the session ID 310 which for example maybe the first session ID 310a, the second session ID 310b, or the third session ID 310c and the copy set 315 which for example may be the first, second, third, fourth, fifth, or sixth copy set 315a-f. The session ID 310 maybe a unique identifier in the form of a hash comprising a concatenation of a hash value derived from the desired service level and/or the hash value derived from the one of the sessions.

For example, the session ID 310 may be constructed by operating a hash function on a string of characters identifying the desired service level according to which the session is desired to be stored to create a first hash value, and concatenating the result with the further result of operating a different hash function on the binary contents, the name, or a string representing otherwise defined properties of the session to create a second hash value. For example, the first session ID 310a may be the unique identifier WNX2878Y for the first copy set 315a, the second copy set 315b, and the fifth copy set 315e, the second session ID 310b may be the unique identifier LKR5973Y for the fourth copy set 315d, and the third session ID 310c may be the unique identifier NTR5698J for the third copy set 315c and the sixth copy set 315f.

Each copy set 315 may comprise one or more volumes in a copy services relationship. The DSS 100 may use for example a Flash Copy Version 1 to create a consistent point-in-time copy across multiple volumes, and even across the plurality of storage subsystem 140, thus managing the consistency of dependent writes.

Figure 4:
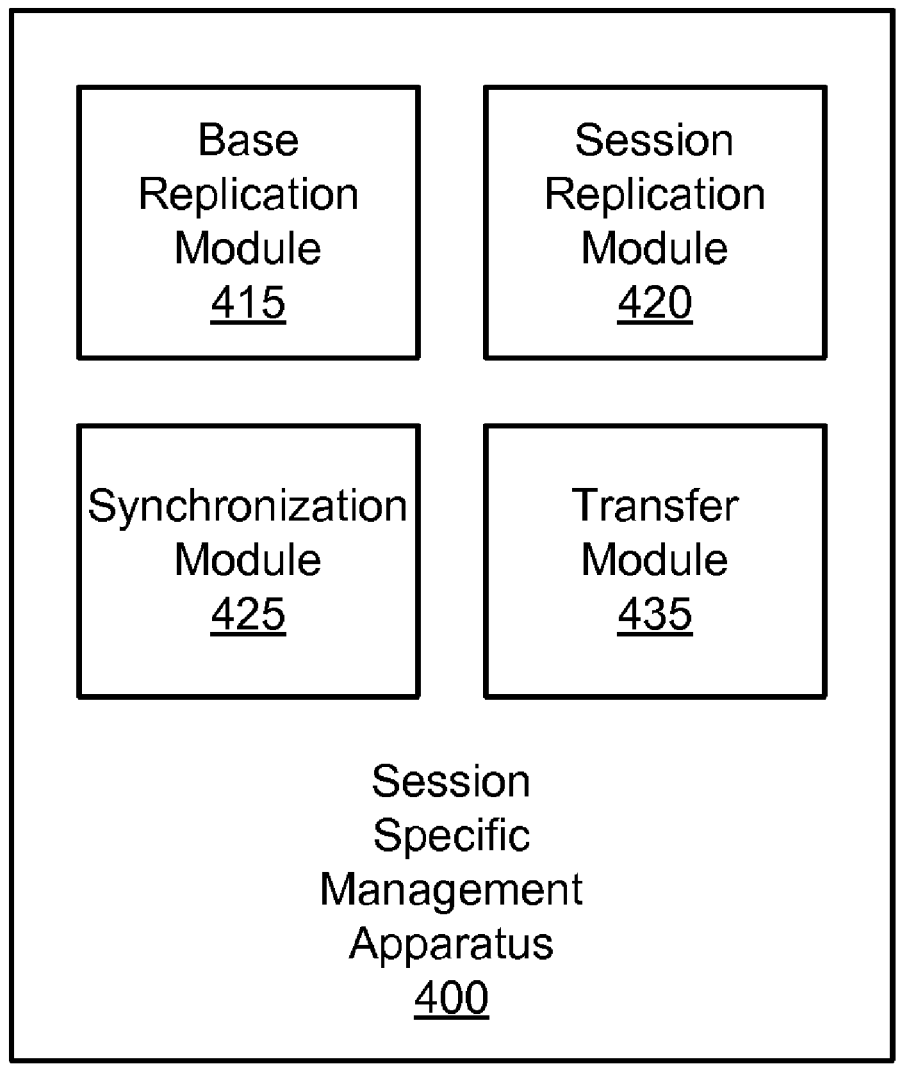
FIG. 4 is a schematic block diagram illustrating one embodiment of a session specific management apparatus of the present invention.

FIG. 4 is a schematic block diagram illustrating one embodiment of a session specific management apparatus 400 of the present invention. The DSS 100 of FIG. 1 may embody the apparatus 400. The description of apparatus 400 refers to elements of FIGS. 1-3, like numbers referring to like elements. The apparatus 400 includes a base replication module 415, a session replication module 420, a synchronization module 425, and a transfer module 435.

In an embodiment, each copy set 315 defines a source volume and at least one target volume in a copy services relationship. For example, the first copy set 315a may define the first volume of the second disk of the second storage device 170 of the first storage subsystem 140 as the source volume and the first volume of the first disk of the third storage device 170 of the first storage subsystem 140 as the target volume in the copy services relationship.

The base replication module 415 replicates the first base table 205a to a first standby server 130b and a second standby server 130c. The first standby server 130b and the second standby server 130c may be the standby server 130b-c of FIGS. 1 and 2. The replicated first standby server base table 205b and the second standby server base table 205c may be substantially the same as the first base table 205a.

In an embodiment, the base replication module 415 replicates the first base table 205a to the first standby server 130b and the second standby server 130c using SQL commands. The SQL commands may include SQL SELECT and INSERT statements. Alternatively, the base replication module 415 may employ a peer to peer remote copy process as is well known to those of skill in the art.

The session replication module 420 replicates first sessions from the session table 210 to the first standby server 130b and second sessions to the second standby server 130c. In an embodiment, the session replication module 420 replicates the first sessions and the second sessions to the first standby server 130b and the second standby server 130c using SQL commands. The SQL commands may include SELECT and INSERT statements. For example, the session replication module 420 may replicate the first sessions represented by the first, third, and fifth rows 305a, 305c, 305e of the session table 210 to the first standby server 130b and the second sessions represented by the fourth row 305d of the session table 210 to the second standby server 130c using SQL SELECT and INSERT statements.

The first and second standby servers 130b-c do not manage the sessions. For example, the active server 130a may manage the sessions represented by the first, second, fourth, and fifth rows 305a, 305b, 305d, 305e respectively of the session table 210. The first standby server 130b may be configured to assume management of the sessions represented by the first, second, fourth, and fifth rows 305a, 305b, 305d, 305e of the session table 210. The session replication module 420 comprises computer readable program stored on the tangible storage device, executed by the processor.

In an embodiment, the synchronization module 425 synchronizes the first base table 205a with the second and third base tables 205b-c. The synchronization module 425 may synchronize the first base table 205a with the standby server base tables 205b-c to mirror any update of the rows of the first base table 205a with the corresponding rows of the standby server base tables 205b-c at regular intervals of time. The synchronization module 425 may use SQL UPDATE, SELECT and INSERT statements to synchronize the first base table 205a with the standby server base tables 205b-c. For example, the synchronization module 425 may synchronize the first base table 205a with the second and third base tables 205b-c using SQL UPDATE, SELECT and INSERT statements to mirror any update of the first and fifth rows 305a, 305e of the first base table 205a as updates are made to the first base table 205a.

Additionally, in an embodiment, the synchronization module 425 further synchronizes the first sessions of the active server session table 210a with the first standby server session table 210b and the second sessions of the active server session table 210a with the second standby server session table 210c. The synchronization module 425 may synchronize the first sessions of the active server session table 210a with the first standby server session table 210b to mirror any update of the rows representing the first sessions of the active server session table 210a with the corresponding rows representing the first sessions of the first standby server session table 210b and the second sessions of the active server session table 210a with the second standby server session table 210c to mirror any update of the rows representing the second sessions of the active server session table 210a with the corresponding rows representing the second sessions of the second standby server session table 210c at regular intervals of time.

The synchronization module 425 may use SQL UPDATE, SELECT or DELETE statements to synchronize the source session table 210a with the standby server session tables 210b-c. For example, the synchronization module 425 may synchronize the first sessions represented by the first, second, and fifth rows 305a, 305b, 305e of the active server source session table 210a with the first standby server session table 210b and the second sessions represented by the fourth row 305d of the active server source session table 210a with the second standby server session table 210c using SQL UPDATE, SELECT and INSERT statements. The synchronization module 425 comprises computer readable program stored on the tangible storage device, executed by the processor.

The transfer module 435 transfers management of the first sessions to the first standby server 130b. In an embodiment, the transfer module 435 transfers management of the first sessions in response to a user command. For example, noticing a failure of the active server 130a, the user may initiate the user command, and in response to the user command, the transfer module 435 may transfer management of the first sessions represented by the first, second, and fifth rows 305a, 305b, 305e of the active server source session table 210a to the first standby server 130b.

In another embodiment, the transfer module 435 transfers management of the first sessions in response to a failure of the active server 130a. For example, in response to the failure of the active server 130a, the transfer module 435 may automatically transfer management of the first sessions represented by the first, second, and fifth rows 305a, 305b, 305e of the active server source session table 210a to the first standby server 130b.

For example, the transfer module 435 may transfer management of the first sessions represented by the first, second, and fifth rows 305a, 305b, 305e of the active server source session table 210a to reduce a processing load on the active server 130a. The transfer module 435 may transfer management of the first sessions to the first standby server 130b to reduce the processing load on the active server 130a.

Additionally, the transfer module 435 terminates management of the first sessions by the active server 130a. For example, if the transfer module 435 transfers the management of the first sessions to the first standby server 130b, the transfer module 435 may further terminate management of the first sessions by the active server 130a. The transfer module 435 comprises computer readable program stored on the tangible storage device, executed by the processor.

After management of the first sessions is transferred to the first standby server 130b, the synchronization module 425 further synchronizes the first sessions of the second session table 210b with the source session table 210a. However, the synchronization module 425 continues to synchronize the first base table 205a to the second base table 205b.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
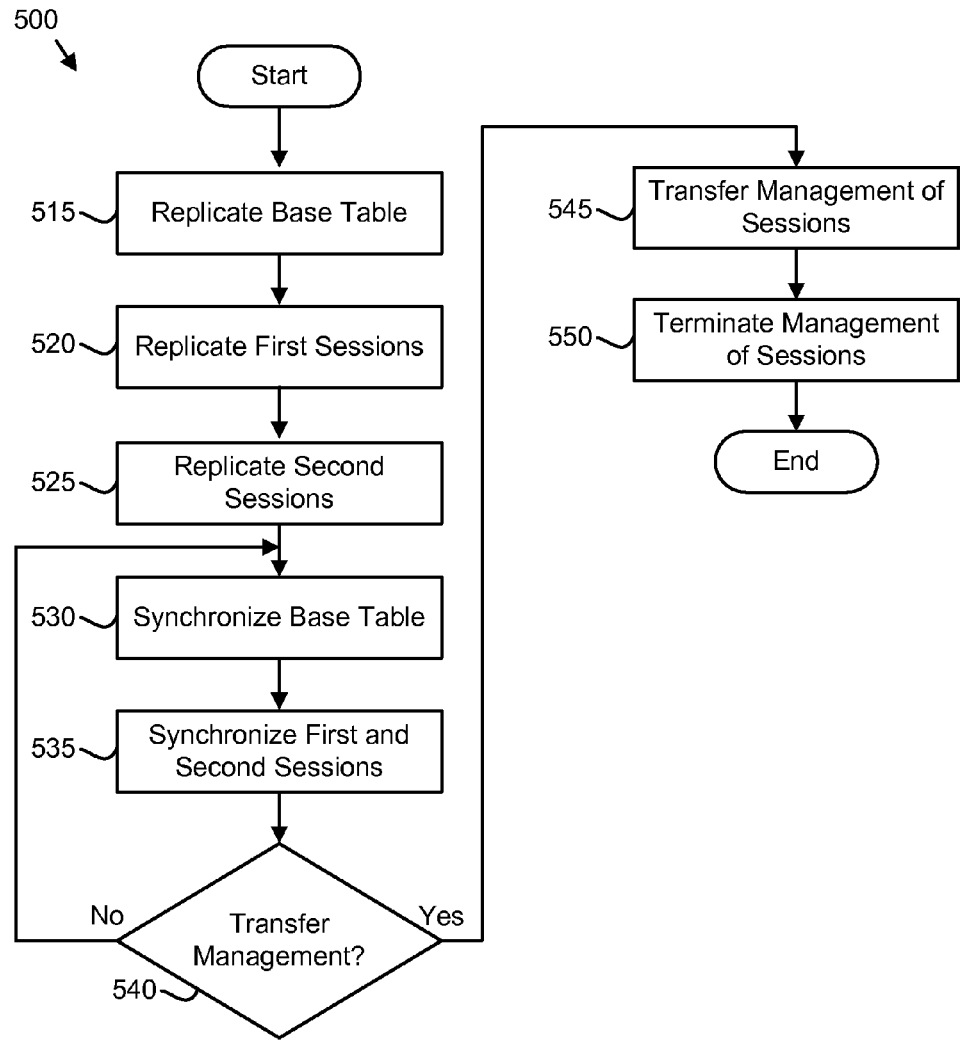
FIG. 5 is a schematic flow chart diagram illustrating one embodiment of a data management information replication method of the present invention.

FIG. 5 is a schematic flow chart illustrating one embodiment of a data management information replication method 500. The method 500 substantially includes the steps to carry out the functions presented above with respect to the operation of described DSS 100 and apparatus 400 of FIGS. 1 and 4. The description of method 500 refers to elements of FIGS. 1-4, like numbers referring to the like elements. In one embodiment, the method 500 is implemented with a computer program product comprising a computer readable medium having a computer readable program. The computer program product in combination with the computing system may be capable of performing the method 500. The computer program readable medium may be executed by one or more of the plurality of servers 130.

For simplicity, the method 500 is described for a first and second standby server 130b-c. However, one of skill in the art will recognize that present invention may be practiced with any number of standby servers. For example, the method 500 may employ three standby servers.

The method 500 starts and in an embodiment, the base replication module 415 replicates 515 the base table 205 to the first standby server 130b and the second standby server 130c. The base table 205 includes configuration parameters for storage devices, logical volumes, physical interconnections, logical interconnections, and logical subsystems of a storage system, and the like.

The base replication module 415 may replicate 515 the base table 205 using SQL commands. In an embodiment, the base replication module 415 replicates 515 the first base table 205a to the first standby server 130b and the second standby server 130c by reading an updated row from the first base table 205a, constructing a SQL command for the row, wherein the SQL command is configured to insert data of the active server base table row in a standby server base table row, and applying the SQL command to the standby servers' base tables 205b-c. The base replication module 415 may replicate 515 the base table 205 as the base table 205 is updated.

The session replication module 420 replicates 520 first sessions from the session table 210a to the first standby server 130b. The session table 210a stores a plurality of sessions. Each session comprises a plurality of copy sets. The active server 130a manages the sessions using the base table 205a and the session table 210a. The first and second standby servers 130b-c do not manage the sessions. The session replication module 420 may replicate 520 the first sessions using SQL commands.

Additionally, the session replication module 420 replicates 525 second sessions to the second standby server 130c. The session replication module 420 may replicate 525 the second sessions using SQL commands.

The synchronization module 425 may synchronize 530 the first base table 205a with the standby server base tables 205b-c. In an embodiment, the synchronization module 425 synchronizes 530 the first base table 205a with the standby server base tables 205b-c by receiving an update for a row of the first base table 205a and sending the update to a specified standby server 130b-c. In one embodiment, the update is a SQL command.

The transfer module 435 determines 540 whether to transfer management of the first sessions to the first standby server 130b. For example, the transfer module 435 may automatically determine 540 to transfer management of the first sessions represented by the first, second, and fifth rows 305a, 305b, 305e of the session table 210a to the first standby server 130b in response to an excessive processing load on the active server 130a.

If the transfer module 435 determines 540 not to transfer management of the first sessions to the first standby server 130b, the method 500 loops to the step 530. If the transfer module 435 determines 540 to transfer management of the first sessions to the first standby server 130b, the transfer module 435 transfers 545 management of the first sessions to the first standby server 130b.

In an embodiment, the transfer module 435 transfers 545 management of the first sessions in response to a user command. In another embodiment, the transfer module 435 transfers management of the first sessions in response to a failure of the active server 130a. In one more embodiment, the transfer module 435 transfers management of the first sessions to reduce a processing load on the active server 130a.

The transfer module 435 may transfer 545 management of the first sessions to the first standby server 130b by sending a message to the active server 130a, changing the active server 130a to not manage the first sessions, changing the standby server 130b to manage the first sessions, and replicating the standby server first sessions to the active server session table 210a. For example, on receiving the user command, the transfer module 435 may automatically send a message to not manage the first sessions to the active server 130a, send a message to the first standby server 130b to change the first standby server 130b to manage the first sessions, and direct the session replication module 420 to replicate the standby server first sessions to the active server session table 210a.

Additionally, the transfer module 435 terminates 550 management of the first sessions by the active server 130a. For example, the transfer module 435 may automatically terminate 550 management of the first sessions represented by the first, second, and fifth rows 305a, 305b, 305e of the session table 210 by the active server 130a on detecting the transfer module 435 transferred management of the first sessions to the first standby server 130b. Thus the method 500 replicates data management information by replicating the first sessions of the active server source session table 210a to the first standby server 130b and the second sessions of the source session table 210a to the second server 130c. The workload of the active server 130a may be shared with the first standby server 130b or the second standby server 130c or both the first and second standby servers 130b-c may assume session management from the active server 130a.

Figure 6:
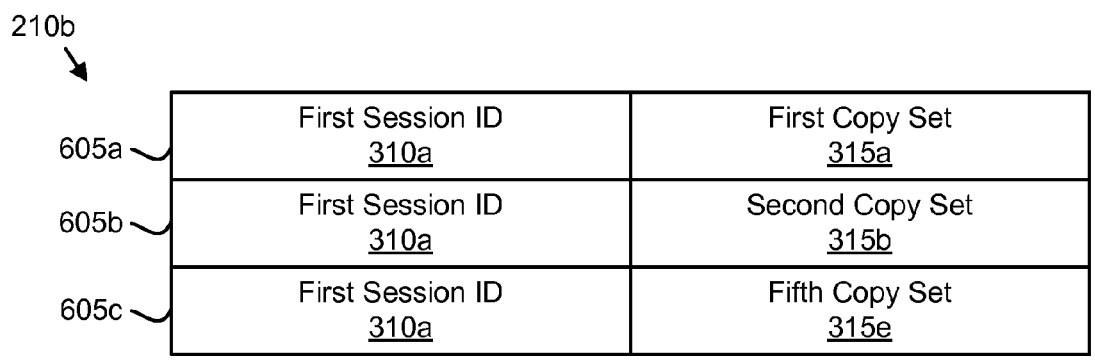
FIG. 6 is a schematic block diagram illustrating one example of the first session table of the present invention.

FIG. 6 is a schematic block diagram illustrating one example of the first session table 210b of the present invention. The description of the first session table 210b refers to elements of FIGS. 1-5, like numbers referring to like elements. The first session table 210b includes a plurality of rows 605a-c. Each row 605 may represent the replicated first sessions represented by the first, second, and fifth rows 305a, 305b, 305e of the active server session table 210a. Although, for simplicity only three (3) rows 605a-c are shown, the first session table 210b may include any number of rows 605. The shown first session table 210b may be the first session table 210b on the first standby server 130b created, replicated, updated by the method 500.

The first session table 210b may be stored in the memory of the first standby server 130b. In the shown embodiment, each row 605 includes the first session ID 310a and the copy set which for example are the first, second, or fifth copy set 315a, 315b, 315c.

The session table module 410 may create 510 the first session table 210b according to schema of the session table 210a. The session replication module 420 may replicate 520 the first, second, and fifth rows 305a, 305b, 305e of the active server session table 210a to the first, second, and third rows 605a, 605b, 605c of the first standby server session table 210b.

The synchronization module 425 may synchronize 535 the first, second, and fifth rows 305a, 305b, 305e representing first sessions of active server session table 210a with the first, second, and third rows 605a, 605b, 605c of the first standby server session table 210b to mirror any update of any column of each row 305 representing first sessions of the active server session table 210a with the corresponding first, second, or third rows 605a, 605b, 605c of the first standby server session table 210b.

The present invention provides an apparatus, a system, and a method for replication of data management information. Beneficially, such an apparatus, a system, and a method would divide management information among a plurality of the standby servers 130. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program, wherein the computer readable program when executed on a computer causes the computer to:

replicate a base table stored on an active server to a first and second standby server, wherein the base table comprises configuration parameters for storage devices, logical volumes, physical interconnections, logical interconnections, and logical subsystems of a storage system;

replicate first sessions from a session table on the active server to the first standby server and second sessions from the session table to the second standby server, the first sessions and the second sessions each comprising a distinct set of sessions from the session table, wherein the session table stores a plurality of sessions, each session comprising a plurality of copy sets, each copy set corresponding to one or more storage volumes in a copy services relationship, and wherein the active server manages the sessions using the base table and the session table and the first and second standby servers do not manage the sessions;

transfer management of the first sessions to the first standby server;

terminate management of the first sessions by the active server;

wherein the computer readable program is further configured to cause the computer to replicate the first sessions, the second sessions, and the base table using Structured Query Language (SQL) commands; and wherein replicating first sessions from a session table on the active server to the first standby server comprises reading a row from the active server session table;

constructing a SQL command for the row, wherein the SQL command is configured to insert data of the active server session table row in a standby server session table row; and applying the SQL command to a specified standby server session table.

2. The computer program product of claim 1, wherein the computer readable program is further configured to cause the computer to:

read a row from the active server base table;

construct a SQL command for the row, wherein the SQL command is configured to insert data of the active server base table row in a standby server base table row; and apply the SQL command to the first and second standby server base tables.

3. The computer program product of claim 1, wherein the computer readable program is further configured to cause the computer to synchronize the active server base table with the standby server base tables.

4. The computer program product of claim 3, wherein the computer readable program is further configured to cause the computer to:
  receive an update for a row of the active server base table;
  construct a SQL command configured to mirror the update in a standby server base table row; and
  apply the SQL command to a specified standby server base table.

5. The computer program product of claim 1, wherein the computer readable program is further configured to cause the computer to synchronize the first sessions of the active server session table with the first standby server session table and the second sessions of the active server session table with the second standby server session table.

6. The computer program product of claim 5, wherein the computer readable program is further configured to cause the computer to:
  receive an update for a row of the active server session table;
  construct a SQL command configured to mirror the update in a standby server session table row; and
  apply the SQL command to a specified standby server session table.

7. The computer program product of claim 1, wherein the computer readable program causes the computer to transfer management of the first sessions to the first standby server by:
  sending a message to the active server;
  changing the active server to not manage the first sessions;
  changing the standby server to manage the first sessions; and
  replicating updates to the standby server first sessions to the active server session table.

8. The computer program product of claim 1, wherein the computer readable program is further configured to cause the computer to transfer management of the first sessions in response to a user command.

9. The computer program product of claim 1, wherein the computer readable program is further configured to cause the computer to transfer management of the first sessions in response to a failure of the active server.

10. The computer program product of claim 1, wherein the computer readable program is further configured to cause the computer to transfer management of the first sessions to reduce a processing load on the active server.

11. The computer program product of claim 1, wherein each copy set defines a source volume and at least one target volume in a copy services relationship.

12. An apparatus to replicate data management information, the apparatus comprising:
  a base replication module configured to replicate a base table stored on an active server to a first and second standby server, wherein the base table comprises configuration parameters for storage devices, logical volumes, physical interconnections, logical interconnections, and logical subsystems of a storage system;
  a session replication module configured to replicate first sessions from a session table stored on the active server to the first standby server and second sessions to the second standby server, the first sessions and the second sessions each comprising a distinct set of sessions from the session table, wherein the session table stores a plurality of sessions, each session comprising a plurality of copy sets, each copy set corresponding to one or more storage volumes in a copy services relationship, and wherein the active server manages the sessions using the base table and the session table, and the first and second standby servers do not manage the sessions; and
  a transfer module configured to transfer management of the first sessions to the first standby server and terminate management of the first sessions by the active server;
  wherein the computer readable program is further configured to cause the computer to replicate the first sessions, the second sessions, and the base table using Structured Query Language (SQL) commands; and
  wherein replicating first sessions from a session table on the active server to the first standby server comprises
    reading a row from the active server session table;
    constructing a SQL command for the row, wherein the SQL command is configured to insert data of the active server session table row in a standby server session table row; and
    applying the SQL command to a specified standby server session table.

13. The apparatus of claim 12, further comprising a synchronization module comprising computer readable program stored on the tangible storage device, executed by the processor, and configured to synchronize the active server base table with the standby server base tables and synchronize the first sessions of the active server session table with the first standby server session table and the second sessions of the active server session table with the second standby server session table using SQL commands.

14. A system to replicate data management information, the system comprising:
  an active server;
  a first standby server;
  a second standby server;
  a base replication module configured to replicate a base table stored on the active server to the first and second standby servers, wherein the base table comprises configuration parameters for storage devices, logical volumes, physical interconnections, logical interconnections, and logical subsystems of the storage system;
  a session replication module configured to replicate first sessions from a session table stored on the active server to the first standby server and second sessions to the second standby server, the first sessions and the second sessions each comprising a distinct set of sessions from the session table, wherein the session table stores a plurality of sessions, each session comprising a plurality of copy sets, each copy set corresponding to one or more storage volumes in a copy services relationship, and wherein the active server manages the sessions using the base table and the session table, and the first and second standby servers do not manage the sessions;
  a transfer module comprising computer readable program stored on the tangible storage device, executed by the processor, and configured to transfer management of the first sessions to the first standby server and terminate management of the first sessions by the active server
  wherein the computer readable program is further configured to cause the computer to replicate the first sessions, the second sessions, and the base table using Structured Query Language (SQL) commands; and
  wherein replicating first sessions from a session table on the active server to the first standby server comprises
    reading a row from the active server session table;

constructing a SQL command for the row, wherein the SQL command is configured to insert data of the active server session table row in a standby server session table row; and applying the SQL command to a specified standby server session table.

15. The system of claim 14 wherein the base replication module replicates the base table and the session replication module replicates the first sessions and the second sessions using SQL commands.

16. The system of claim 14, further comprising a synchronization module comprising computer readable program stored on the tangible storage device, executed by the processor, and configured to synchronize the active server base table with the standby server base tables and synchronize the first sessions of the active server session table with the first standby server session table and the second sessions of the active server session table with the second standby server session table using SQL commands.

17. A method for deploying computer infrastructure, comprising integrating computer readable program into a computing system, wherein the program in combination with the computing system is capable of performing the following:

replicating a base table stored on an active server to a first and second standby server using SQL commands, wherein the base table comprises configuration parameters for storage devices, logical volumes, physical interconnections;

replicating first sessions from a session table stored on the active server to the first standby server and second sessions to the second standby server using SQL commands, the first sessions and the second sessions each comprising a distinct set of sessions from the session table, wherein the session table stores a plurality of sessions, each session comprising a plurality of copy sets, each copy set corresponding to one or more storage volumes in a copy services relationship, and wherein the active server manages the sessions using the base table and the session table and the first and second standby servers do not manage the sessions;

transferring management of the first sessions to the first standby server in response to a failure of the active server; and terminating management of the first sessions by the active server;

wherein the computer readable program is further configured to cause the computer to replicate the first sessions, the second sessions, and the base table using Structured Query Language (SQL) commands; and wherein replicating first sessions from a session table on the active server to the first standby server comprises reading a row from the active server session table;

constructing a SQL command for the row, wherein the SQL command is configured to insert data of the active server session table row in a standby server session table row; and applying the SQL command to a specified standby server session table.

* * * * *